United States Patent
Courteille (10) Patent No.: US 10,015,137 B2
(45) Date of Patent: Jul. 3, 2018

(54) DEVICE FOR INTERCONNECTING COMMUNICATION NETWORKS WITH CONTROLLED SECURITY

(71) Applicant: SAFRAN ELECTRONICS & DEFENSE, Boulogne-Billancourt (FR)

(72) Inventor: Jean-Marie Courteille, Boulogne-Billancourt (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 0 days.

(21) Appl. No.: 15/105,549

(22) PCT Filed: Dec. 19, 2014

(86) PCT No.: PCT/EP2014/078907
§ 371 (c)(1),
(2) Date: Jun. 16, 2016

(87) PCT Pub. No.: WO2015/092042
PCT Pub. Date: Jun. 25, 2015

(65) Prior Publication Data
US 2016/0344695 A1    Nov. 24, 2016

(30) Foreign Application Priority Data
Dec. 19, 2013 (FR) .................... 13 63062

(51) Int. Cl.
*G06F 9/00* (2006.01)
*H04L 29/06* (2006.01)
(Continued)

(52) U.S. Cl.
CPC ........ *H04L 63/0227* (2013.01); *G06F 21/606* (2013.01); *G06F 21/85* (2013.01); *H04L 63/0209* (2013.01)

(58) Field of Classification Search
CPC .................................................. H04L 63/0209
(Continued)

(56) References Cited

U.S. PATENT DOCUMENTS 8,397,286 B2 * 3/2013 Declety ............... H04L 63/0209
713/166
8,549,293 B2 * 10/2013 Hahn .................... H04W 12/06
455/552.1
(Continued)

FOREIGN PATENT DOCUMENTS

FR    2 922 705 A1    4/2009

OTHER PUBLICATIONS

Search Report in International Application No. PCT/EP2014/078907 dated Apr. 8, 2015, with English translation coversheet. 6 pages.
(Continued)

*Primary Examiner* — Teshome Hailu
(74) *Attorney, Agent, or Firm* — Womble Bond Dickinson (US) LLP (57) ABSTRACT

The invention relates to a device for interconnecting at least two data-communication networks, connecting a first network qualified as a high-security network and at least one second network qualified as a low-security network, the device including a one-way channel referred to as downlink channel between the high-security network and the low-security network, and a one-way channel referred to as uplink channel between the low-security network and the high-security network, the uplink channel being configured, in accordance with at least one predetermined data model from the low-security network or a dedicated loading channel, such as to transmit a return signal towards the high-security network whenever an uplink data stream sent from the low-security network to the high-security network
(Continued)

includes all or part of the predetermined data model, the return signal being transmitted together with a transmission of the uplink data stream or at the end of a transmission of the uplink stream towards the high-security network.

11 Claims, 7 Drawing Sheets

(51) Int. Cl.
    *G06F 21/60* (2013.01)
    *G06F 21/85* (2013.01)
(58) Field of Classification Search
    USPC .......................................................... 726/13
    See application file for complete search history.

(56) References Cited

U.S. PATENT DOCUMENTS

| | | |
|---|---|---|
| 2004/0260941 A1 | 12/2004 | Fearnley et al. |
| 2005/0022023 A1 | 1/2005 | Chincheck et al. |
| 2010/0180111 A1* | 7/2010 | Hahn .................... H04W 12/06 713/150 |
| 2010/0299742 A1* | 11/2010 | Declety ............... H04L 63/0209 726/13 |
| 2012/0051544 A1* | 3/2012 | Liu ........................ H04W 12/02 380/270 |
| 2013/0268628 A1* | 10/2013 | Zhu ........................ H04W 52/04 709/217 |
| 2014/0254799 A1* | 9/2014 | Husted .................. H04L 63/068 380/270 |
| 2015/0237499 A1* | 8/2015 | Tg .......................... H04W 12/06 726/4 |
| 2015/0358813 A1* | 12/2015 | Lee ........................ H04W 12/04 380/279 |

OTHER PUBLICATIONS

Search Report in French Application No. 1363062 dated Jul. 21, 2014, with English translation coversheet. 3 pages.

* cited by examiner

DEVICE FOR INTERCONNECTING COMMUNICATION NETWORKS WITH CONTROLLED SECURITY

GENERAL TECHNICAL FIELD

The invention relates to a secure interconnection device enabling bidirectional communication between two communication networks; a first high-security network and a second network whereof the security is lower than that of the first network. Such a device can be used especially in an ETHERNET network, a network in which ETHERNET frames transit.

PRIOR ART

Figure 1:
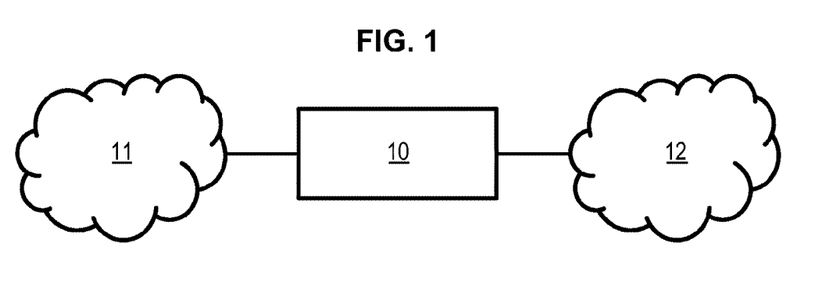

FIG. 1 illustrates general architecture of a system comprising an interconnection device 10 for connecting a first network 11 to a second network 12. The two networks 11, 12 have different levels of security.

Network means an actual communication network and the set of connected devices which can communicate with each other.

Level of security means a set of operating rules and constraints imposed on the network to ensure that only authorized data stream can transit over this network.

When networks having different levels of security communicate with each other, it is necessary to ensure that the high-security network cannot be corrupted by attacks or erratic operations coming from the low-security network.

In some contexts needing a high level of security, this guarantee must be very strong, or even absolute.

This is particularly necessary in the context of avionics where the data network connecting the control units of the aircraft must absolutely offer a very high level of security especially during flight phases.

It is however advantageous to connect this high-security network to a lower-security network to, inter alia, recover data on the different parameters of flight during maintenance phases of the aircraft.

It is also advantageous to be able to provide real-time information on and during the flight over a passenger network.

It is known to construct one-way gateways between two networks having different levels of security. In this case, the gateway authorizes data transfers from the high-security network to the low-security network. The one-way aspect can even be guaranteed at the physical level of communication, for example by using a diode such as described in document EP 1 533 947 B1.

This type of gateway ensures that it is impossible to let pass data coming from the low-security network and compromise the high-security network.

However, to enable operation of some applications it can prove necessary to transmit information coming from the low-security network to the high-security network. These can sometimes be simple commands.

It is also advantageous to have stream control mechanisms during data transfers from the high-security network to the low-security network. The stream control needs to be able to return information to the source of the transfer and therefore from the low-security network to the high-security network.

However, it is preferable for the level of security to be maintained at a very high level. Control over information returning from the low-security network to the high-security network should therefore be retained. This control ensures security of a very high level.

It is conventional to set up gateways using a firewall in this type of situation. These firewalls organize filtering of data circulating on the gateway. These instances of filtering are done as a function of the communication protocols used and addresses and port numbers involved in communication.

But the level of security contributed by such a firewall is insufficient in some contexts where the need for security is particularly high.

It is advantageous to be able to raise the level of security of such a gateway to ensure a level of security close to the level of security contributed by a one-way gateway.

PRESENTATION OF THE INVENTION

The invention responds to this need and according to a first aspect proposes an interconnection device of at least two data communication networks, connecting a first network qualified as high-security network and at least one second network qualified as low-security network, the device comprising:

- a one-way channel known as downlink channel between the high-security network and the low-security network;
- a one-way channel known as uplink channel between the low-security network and the high-security network, the uplink channel being configured, as a function of at least one data model predetermined in advance originating from the low-security network or a dedicated loading channel, to transmit a return signal to the high-security network when an uplink data stream originating from the low-security network to the high-security network comprises all or part of the predetermined data model, the return signal being transmitted jointly to transmission of the uplink data stream or on completion of transmission of the uplink stream to the high-security network.

The invention is advantageously completed by the following characteristics, taken singly or in any of their technically possible combinations.

The data stream comprising a succession of data packets, each packet comprising several data fields, the uplink channel is configured to perform a detection step of a set of data in conformity with a reference data model in the uplink data stream originating from the low-security network.

The uplink channel is further configured to perform a triggering step of transmission of a return signal to the high-security network when an uplink data stream originating from the low-security network to the high-security network comprises all or part of the predetermined data model.

The reference data model belongs to a set of at least one reference data model, each reference data model of the set corresponding to a return stream associated with the detected reference data model.

The reference data model is of a size greater than or equal to the return stream.

The uplink channel is further configured to perform a construction step of a return stream from the data stream originating from the low-security network, the construction consisting of extracting some of the data from the uplink data stream, the return stream being the signal constructed as a result.

The uplink channel is configured to perform a construction step of a reference data model from a data stream originating from the high-security network.

The uplink channel is configured to perform verification of integrity of the uplink data stream.

Verification of the data stream integrity is made during transmission of said uplink stream.

The uplink channel is configured, if the uplink stream is not correct, while part of said uplink stream is transmitted to the high-security network, for inserting an indication in a frame of the uplink stream indicating that the uplink stream is not correct.

If the uplink stream does not include automatic insertion of a CRC, the low-security network is configured to formulate a CRC such that the uplink stream intended for the secure network is correct.

The downlink comprises a module qualified to guarantee a one-way character of said downlink said module preferably being a diode.

The construction step of a reference data model from a data stream originating from the high-security network is performed after the following steps:

detection in the data stream originating from the high-security network of a set of data in conformity with an initialization data stream;

verification of integrity of the data stream detected in this way originating from the high-security network; and construction of the reference data model from the data stream originating from the high-security network or from the dedicated loading channel.

The invention also relates to an assembly comprising a plurality of devices according to the invention, comprising one and the same dedicated channel for guiding the reference data model to each uplink channel of each device.

The invention also relates to an assembly comprising a plurality of devices according to the invention, arranged head to tail and having dedicated configuration links independent of the uplink and downlink streams.

According to a second aspect, the invention relates to an assembly comprising a plurality of devices according to the first aspect of the invention, comprising one and the same dedicated channel for guiding the reference data model to each uplink channel of each device.

According to a third aspect, the invention relates to an assembly comprising a plurality of devices according to the first aspect of the invention, placed head to tail and having dedicated configuration links independent of the uplink and downlink streams.

The invention can be implemented by hardware only, that is, without a processor, with security increasing since no software is required. Implementation is controlled end to end.

The invention is especially based on transmission of a return signal preceded by a construction step of a return signal consecutively to recognition of a reference model expected at the start of each packet of the uplink data stream.

In particular, construction of the return signal is dynamic. The return signal can consist of static data and/or data coming directly from the uplink data stream transmitted by the low-security network, the proportion of these data being flexible to ensure passage of a plurality of protocols or adapting to different levels of security.

As a consequence, compared to the techniques of the prior art, especially those described in document FR 2 992 705, there is no passage of data via a dedicated low-rate internal channel.

PRESENTATION OF THE FIGURES

Other characteristics, aims and advantages of the invention will emerge from the following description which is purely illustrative and non-limiting and which must be considered with respect to the appended drawings in which, apart from the FIG. 1 already discussed.

In all figures similar elements bear identical reference numerals.

DETAILED DESCRIPTION OF THE INVENTION

Figure 2:
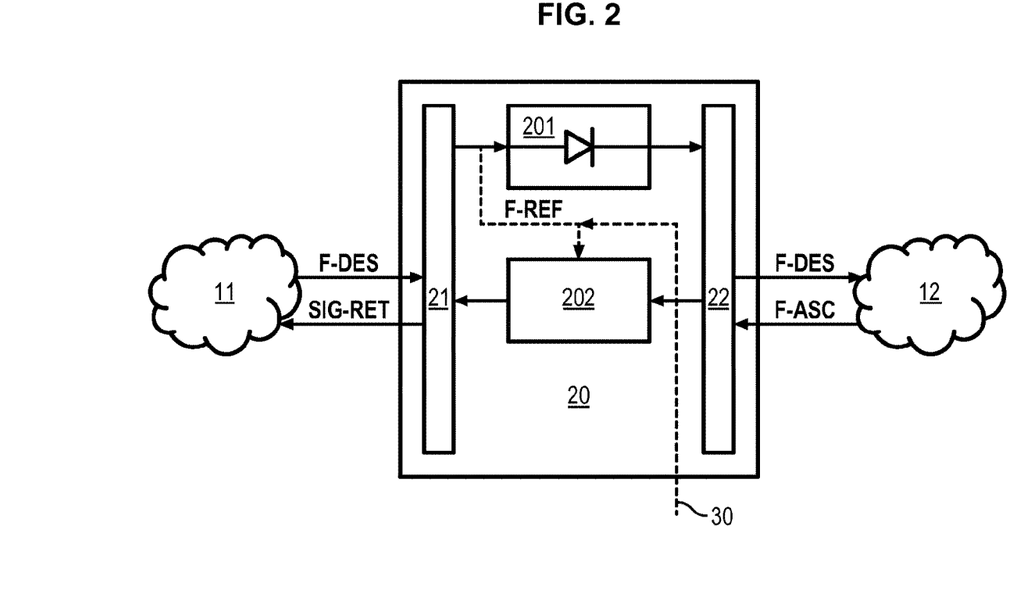
FIG. 2 schematically illustrates an interconnection device according to a first aspect of the invention.

FIG. 2 illustrates an interconnection device 20 of at least two data communication networks, connecting a first network 11 qualified as high-security network and at least one second network 12 qualified as low-security network.

Such a device further comprises a first communication interface 21 with the low-security network 11 and a second communication interface 22 with the high-security network 12.

The interconnection device also comprises a downlink 201 by which a downlink data stream F-DES originating from the high-security network 11 intended for the low-security network 12 transits.

The interconnection device also comprises an uplink channel 202 by which an uplink data stream F-ASC transits which can trigger sending a return signal SIG-RET to the low-security network 11. This triggering can be initiated as a function of at least one datum of the uplink data stream.

The downlink, uplink data streams and the return signal SIG-RET preferably consist of data organized according to packets in ETHERNET format, which implies that a CRC is automatically inserted into the frames composing the different streams.

In this way, the downlink 201 is configured to let pass all the data stream of the High-security network 11 to the low-security network 12.

In particular, the downlink comprises a module qualified to guarantee a one-way character of the downlink. Such a module is preferably similar to a function of diode type.

Furthermore, as a function of at least one data model F-REF predetermined in advance (hereinbelow reference data model F-REF) originating from the high-security network 11 or a dedicated independent loading channel 30, the uplink channel 202 is configured to transmit a return signal SIG-RET to the high-security network 11 when an uplink data stream F-ASC originating from the low-security network 12 to the high-security network 11 comprises all or part of the predetermined data model F-REF. The return signal SIG-RET can be transmitted at the same time as the uplink stream F-ASC or else on completion of the complete transmission of the uplink stream F-ASC.

It is under some particular conditions that transmission of a return signal SIG-RET to the low-security network 12 will be initiated, conditions which will be described hereinbelow in the embodiments of a method for controlling a transmission of a data stream executed by the uplink channel 202 configured to perform the steps described hereinbelow in relation to each of the embodiments.

Figure 3:
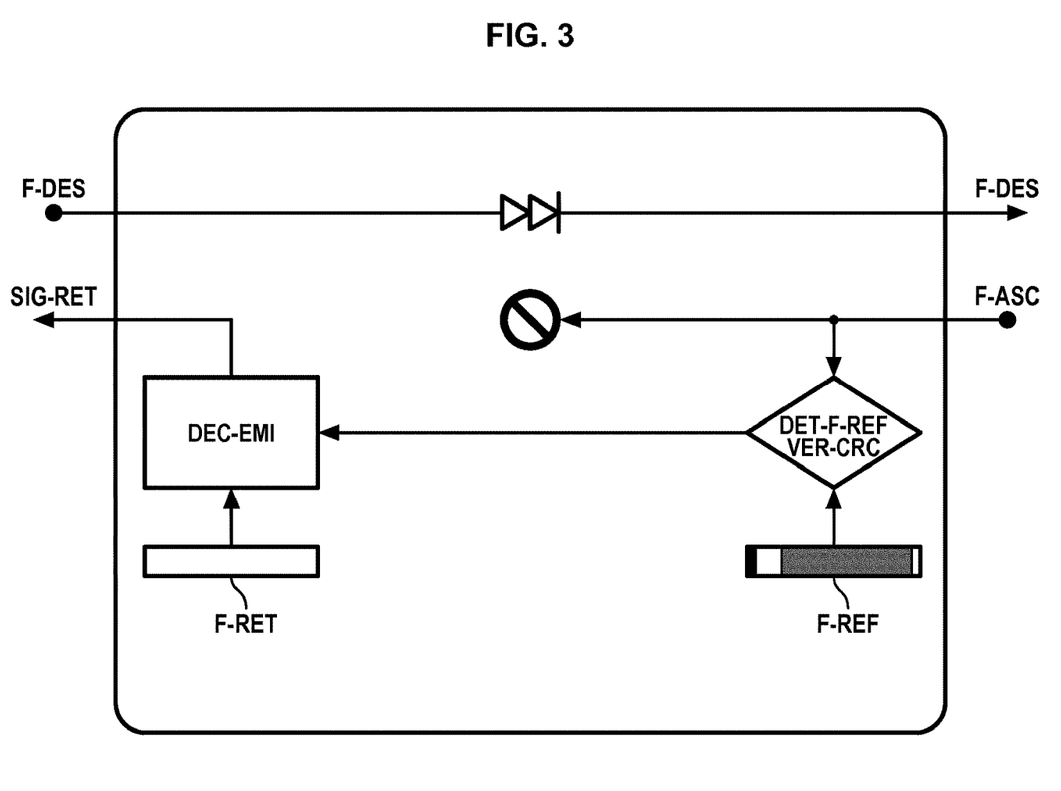
FIG. 3 schematically illustrates a first embodiment of a method for controlling a transmission of a data stream in an interconnection device according to the invention.

FIG. 3 illustrates a first embodiment of a method for controlling a transmission of a data stream executed by the uplink channel 202 of the interconnection device of FIG. 2.

According to this first embodiment, in a first step DET-F-REF a set of data in conformity with a reference data model F-REF is detected in the uplink data stream F-ASC originating from the low-security network 12 intended for the high-security network 11. The reference data model F-REF can come either from the high-security network or from a dedicated channel 30.

Next, in a second step VER-CRC, integrity of the uplink data stream F-ASC is verified as is standard to avoid spreading content the integrity of which would not be correct.

Next, if a set of data in conformity with a reference model F-REF is detected and if the uplink data stream F-ASC is correct, in a third step DEC-EMI transmission of a return signal SIG-RET to the high-security network 11 is triggered, the return signal SIG-RET being a predetermined return data stream FRET.

The return signal in this first embodiment is independent of the downlink stream F-DES and of the uplink stream F-ASC.

Also, this return data stream F-RET is predetermined in that it is in conformity with a set of data pre-loaded in a memory (not shown) of the interconnection device.

The return signal SIG-RET in this first embodiment is transmitted on completion of transmission of the uplink stream F-ASC.

Figure 4:
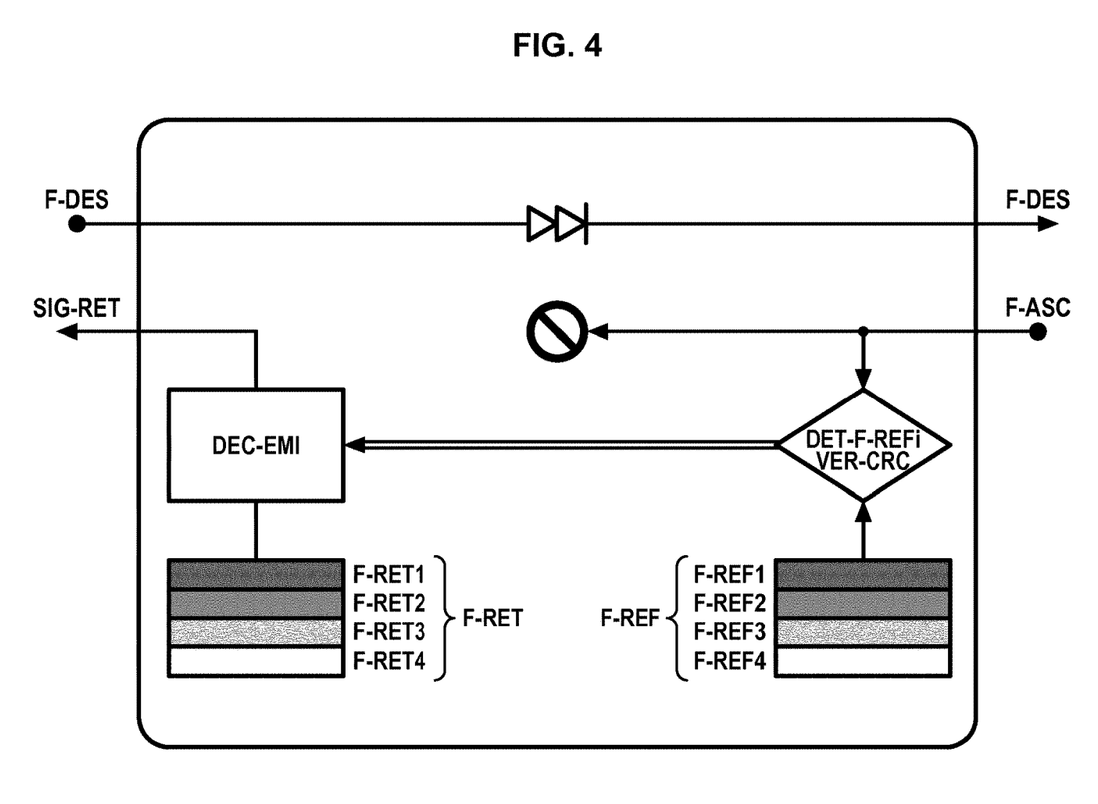
FIG. 4 schematically illustrates a second embodiment of a method for controlling a transmission of a data stream in an interconnection device according to the invention.

FIG. 4 illustrates a second embodiment, according to which, in addition to the characteristics of the first embodiment the reference data model F-REF belongs to a set of reference data models F-REF1, F-REF2, F-REF3, F-REF4 such that a reference data model from these reference data models is detected DET-F-REFi with i=1, 2, 3, 4 or more generally i=1, . . . , N, with N the number of reference data models, and it is integrity of the detected reference data model F-REFi which is verified, with detection and verification triggering transmission DEC-EMI of a return signal SIG-RET which is a predetermined data stream F-RETi corresponding to the detected reference data model. The reference data models F-REFi can come either from the high-security network or a dedicated channel 30.

According to this embodiment, for each stored reference stream, a predetermined return stream FRET is stored.

For each of the first and second embodiments described hereinabove the reference model is of a size greater than or equal to the return stream FRET this which intrinsically causes a rate reduction along the uplink channel.

Also, the uplink channel 202 can comprise a rate reducer (not shown) which limits the number of packets transmitted per time unit on the uplink channel and especially those of the return signal SIG-RET. Such rate reduction can be carried out by means of a monostable device, a decimation device or else a sliding window.

The advantage of the resulting rate limitation is that the first high-security network 11 will not be stressed beyond a predetermined load.

In this second embodiment, the return signal SIG-RET is transmitted on completion of the transmission of the uplink stream F-ASC.

Figure 5:
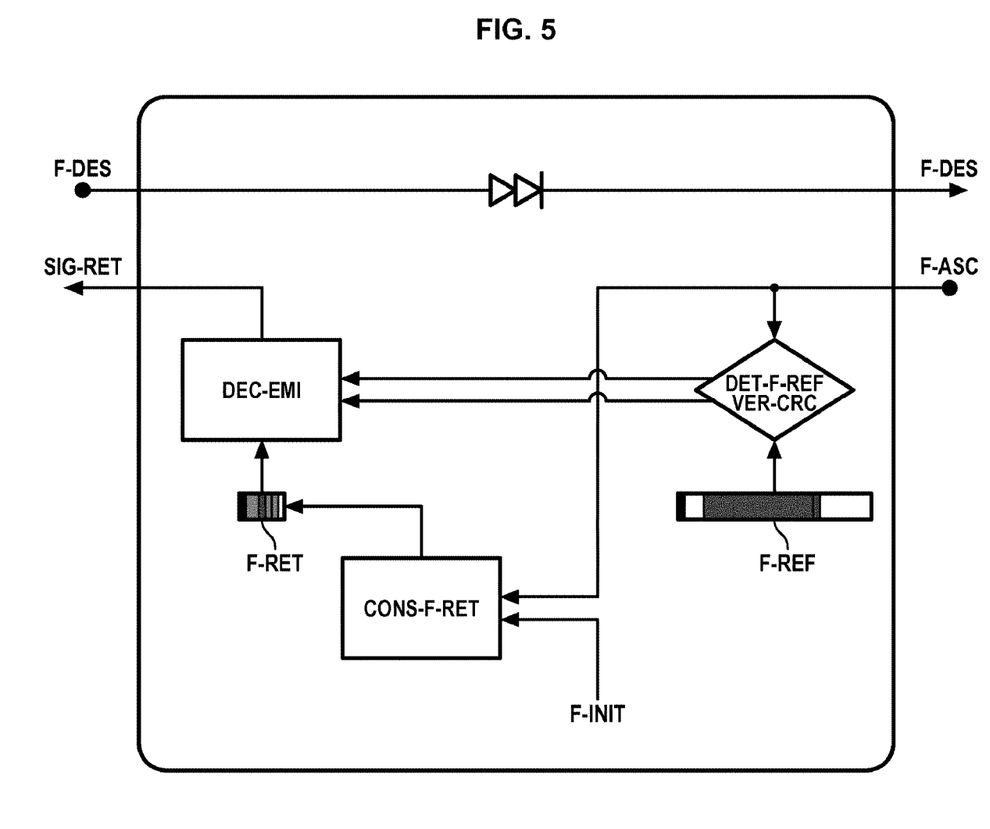
FIG. 5 schematically illustrates a third embodiment of a method for controlling a transmission of a data stream in an interconnection device according to the invention.

FIG. 5 illustrates a third embodiment comprising a construction step CONS-F-RET of the return stream F-RET from the uplink data stream originating from the Low-security network 12, the construction consisting of extracting some of the data from the uplink data stream, the return signal SIG-RET being the signal constructed as a result.

Furthermore, as in the first and second embodiments, the method comprises a step DET-F-REF according to which a set of data in conformity with a reference data model F-REF is detected in the uplink data stream F-ASC originating from the low-security network 12 intended for the high-security network 11. The reference data model F-REF can come either from the high-security network or from a dedicated channel 30.

And if a set of data in conformity with a reference model is detected, transmission of the return signal SIG-RET to the high-security network 11 is triggered.

The return stream FRET, and therefore the return signal SIG-RET, comprises data coming from the uplink stream and data F-INIT predetermined in advance. As a consequence, the return stream comprises both static and dynamic data (since they depend on data from the uplink stream which can be different from one stream to the other).

According to this embodiment, the return signal SIG-RET can be transmitted after complete receipt of the uplink stream F-ASC or else jointly on transmission of the uplink stream.

More precisely the reference data model F-REF includes a set of information defining byte by byte the way of working out on the fly (such as a partition) the return stream FRET from the uplink stream F-ASC. It indicates placing on the return stream FRET:

either a static datum F-INIT which is a subset of the reference data model F-REF;

or a datum coming from the uplink stream F-ASC, which is further maskable bit by bit to finely select the extent of what will be authorized to return from the non-secure network 12 to the secure network 11;

or automatic insertion, or not, of an integrity check word CRC at the end of the frame relating to the stream now formulated on the fly.

According to this embodiment and in the case of joint transmission of the uplink stream F-ASC and of the return signal VER-CRC-RET, the CRC is calculated during transmission of the uplink stream F-ASC and verification VER-CRC of integrity of the stream is done on the fly. If the verified stream is not correct, while part is received, a CRC indicating non-integrity of the stream will be inserted in the frame during transmission of the uplink stream to indicate to the high-security network that the received stream is not correct.

Advantageously, if addition of the automatic CRC is deactivated and the corresponding placement is attributed to the uplink stream F-ASC, the non-secure network 12 will be responsible for working out a correct value for CRC relating for the entire return stream FRET formulated dynamically. To this end, the non-secure network 12 has to have complete knowledge of the return signal FRET and the corresponding static data F-INIT. In the absence of this information it will be impossible for the non-secure network 12 to submit an uplink stream F-ASC valid for the secure network 11.

In addition, as in the second embodiment illustrated in FIG. 4, the reference data model F-REF can belong to a set of reference data models F-REF1, F-REF2, F-REF3, F-REF4 (not shown), the return streams F-RETi further comprise data F-INITi predetermined in advance, a reference data model F-REF of the set of reference data models.

Figure 6:
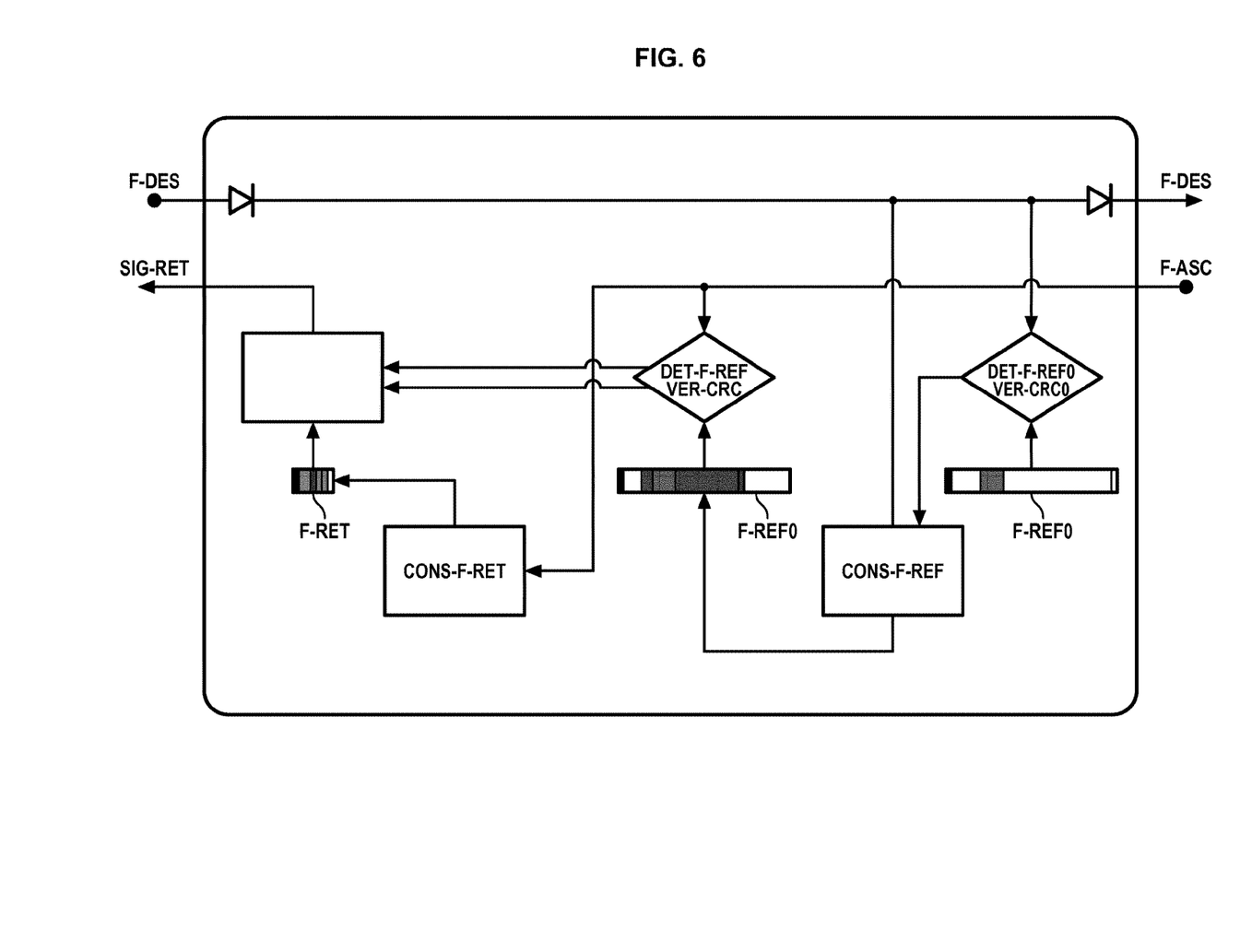
FIG. 6 schematically illustrates a fourth embodiment of a method for controlling a transmission of a data stream in an interconnection device according to the invention.

FIG. 6 illustrates a fourth embodiment in conformity with the third embodiment but in which the uplink channel 202 is further configured to perform a construction step CONS-F-REF of a reference data model in this case from the data stream originating from the high-security network 11.

Advantageously and in addition, the construction step CONS-F-REF of the reference stream from a data stream originating from the high-security network 11 is performed after the following steps:

detection in the data stream originating from high-security network of a set of data in conformity with an initial reference data stream F-REF0;

verification, of known type, VER-CRC0 of integrity of the initial reference data stream detected in this way originating from the high-security network.

As is evident from FIG. 6, the construction step CONS-F-REF of the reference stream is performed if and only if the reference data stream F-REF0 is correct, i.e, with a correct CRC.

In addition, it is possible in conformity with this fourth embodiment to construct several reference streams, and as for the first embodiment the return stream belongs to a set of several return streams, a return stream corresponding to a reference stream.

The reference data model F-REFi can originate either from the high-security network or from a dedicated channel 30.

Figure 7:
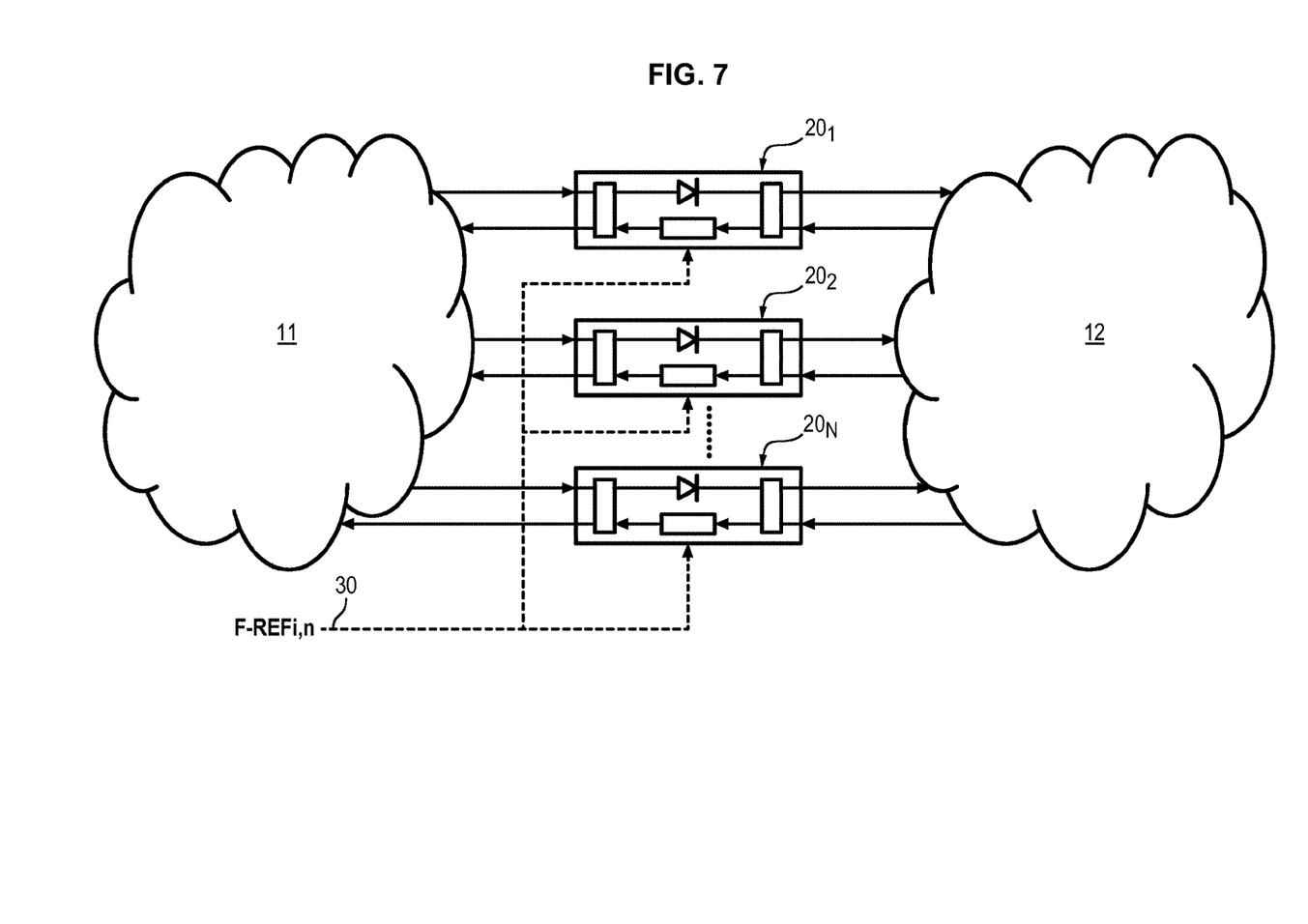
FIG. 7 schematically illustrates an assembly according to a second aspect of the invention.

According to a second aspect, FIG. 7 illustrates a set of interconnection devices in conformity with the first aspect of the invention and operating according to the first, second or even third embodiments aggregated such that one and the same dedicated channel 30 feeds each interconnection arrangement $20_1$, $20_2$, $20_N$ with reference data models F-REFi,n with n=1, N and i the index of the reference data model.

Figure 8:
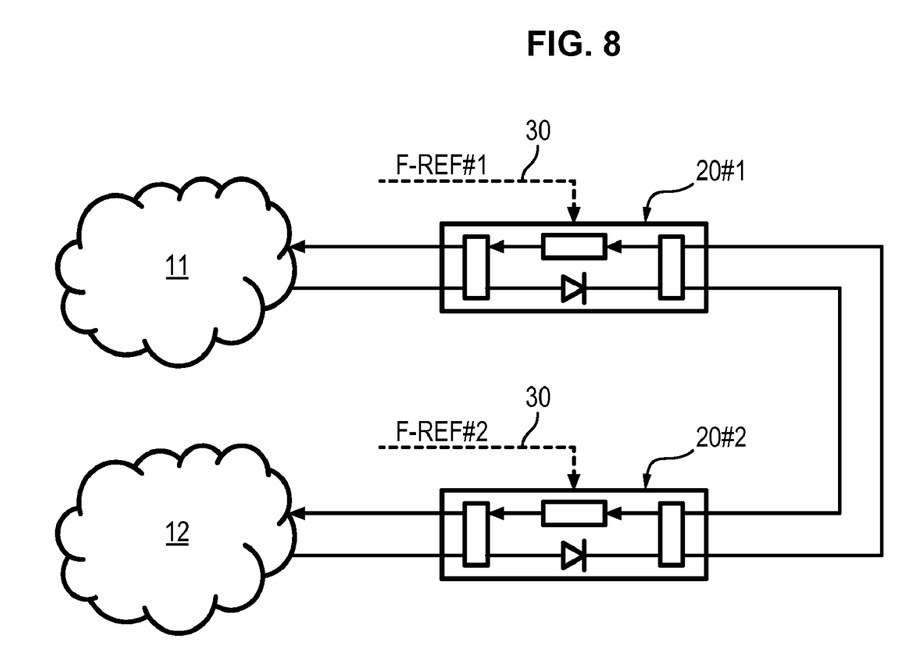
FIG. 8 schematically illustrates an assembly according to a third aspect of the invention.

According to a third embodiment, FIG. 8 illustrates a set of two interconnection devices 20#1, 20#2 in conformity with the first aspect of the invention operating according to a method in conformity with the first, second or even third embodiments arranged relative to each other head to tail. According to this embodiment, access both to the high-security network 11 and also the low-security network 12 is controlled by uplink and downlink channels described earlier. Each device 20#1, 20#2 further comprises a dedicated channel 30 for guiding reference data models F-REFi#1, F-REFi#2. Such a configuration produces an assembly offering controlled security independently in each direction.

The invention claimed is:

1. An interconnection device of at least two data communication networks, connecting a first network qualified as a high-security network and at least one second network qualified as a low-security network, the device comprising
a one-way channel known as downlink channel between the high-security network and the low-security network, the downlink comprises a module qualified to guarantee one-way character of said downlink, said module preferably being a diode;
a one-way channel known as uplink channel between the low-security network and the high-security network, the uplink channel being configured, as a function of at least one data model predetermined in advance originating from the low-security network or a dedicated loading channel, to transmit a return signal (SIG-RET) to the high-security network if all or part of the predetermined data model is detected, as a condition for transmission of the return signal, in an uplink data stream (F-ASC) which originates from the low-security network and which is intended for the high-security network, the return signal (SIG-RET) being transmitted jointly to transmission of the uplink data stream (F-ASC) or on completion of transmission of the uplink stream (F-ASC) to the high-security network,
wherein the return signal (SIG-RFT) comprises predetermined data registered prior to transmission of the uplink data stream (F-ASC) to the high-security network.

2. The interconnection device according to claim 1, wherein the data stream comprising a succession of data packets, each packet comprising several data fields, the uplink channel is configured to perform a detection step (DET-F-REF, DET-F-REFi) of a set of data in conformity with a reference data model in the uplink data stream originating from the low-security network.

3. The interconnection device according to claim 2, wherein the uplink channel is further configured to perform a triggering step (DEC-EMI) of transmission (F-RET, F-RETi) of a return signal (SIG-RET) to the high-security network when an uplink data stream (F-ASC) originating from the low-security network to the high-security network comprises all or part of the predetermined data model.

4. The interconnection device according to claim 2, wherein the reference data model belongs to a set of at least one reference data model, each reference data model of the set corresponding to a return stream associated with the detected reference data model.

5. The interconnection device according to claim 2, wherein the reference data model is of a size greater than or equal to the return stream.

6. The interconnection device according to claim 2, wherein the uplink channel is further configured to perform a construction step (CONS-F-RET) of a return stream from the data stream originating from the low-security network, the construction consisting of extracting some of the data from the uplink data stream, the return stream being the signal constructed as a result.

7. The interconnection device according to claim 1, wherein the uplink channel is configured to perform a construction step (CONS-F-REF) of a reference data model from a data stream originating from the high-security network.

8. The interconnection device according to claim 1, wherein the uplink channel is configured to perform verification (VER-CRC) of integrity of the uplink data stream (F-ASC).

9. The interconnection device according to claim 8, wherein the uplink channel is configured, if the uplink stream is not correct, while part of said uplink stream (F-ASC) is transmitted to the high-security network, for inserting an indication in a frame of the uplink stream indicating that the uplink stream is not correct.

10. The interconnection device according to claim 1, wherein if the uplink stream does not include automatic insertion of a CRC, the low-security network is configured to formulate a CRC such that the uplink stream (F-ASC) intended for the secure network is correct.

11. The interconnection device according to claim 6, wherein the construction step (CONS-F-REF) of a reference data model from a data stream originating from the high-security network is performed after the following steps:
- detection in the data stream originating from the high-security network of a set of data in conformity with an initialization data stream (F-REF0);
- verification (VER-CRC0) of integrity of the data stream detected in this way originating from the high-security network; and
- construction of the reference data model from the data stream originating from the high-security network or from the dedicated loading channel.

\* \* \* \* \*